United States Patent [19]

Helferich et al.

[11] Patent Number: 4,846,906

[45] Date of Patent: Jul. 11, 1989

[54] METHODS FOR THE MANUFACTURE OF POROUS CERAMIC SHAPES CONTAINING MEMBRANEOUS SURFACES

[75] Inventors: Richard L. Helferich, Clayton; Robert C. Schenck, Kettering, both of Ohio

[73] Assignee: The Duriron Company, Inc., Dayton, Ohio

[21] Appl. No.: 127,639

[22] Filed: Dec. 2, 1987

[51] Int. Cl.[4] .............................................. B32B 18/00
[52] U.S. Cl. ....................................... 156/89; 156/245; 55/523; 106/75; 106/84; 210/510.1; 264/58; 264/59; 264/60; 264/63
[58] Field of Search ......................... 156/89, 245, 289; 55/523; 210/510.1; 264/57, 58, 59, 60, 63; 106/75, 84

[56] References Cited

U.S. PATENT DOCUMENTS

| | | | |
|---|---|---|---|
| 1,638,849 | 8/1927 | Haverstick | 106/84 |
| 1,638,888 | 8/1927 | Sepiga | 106/84 |
| 2,216,251 | 10/1940 | Quisling | 106/75 |
| 2,322,667 | 6/1943 | Seastone et al. | 106/84 |
| 3,419,495 | 12/1968 | Weldes et al. | 106/84 |
| 3,700,470 | 10/1972 | Barlon | 106/75 |
| 3,855,393 | 12/1974 | Rao | 106/75 |
| 4,133,691 | 1/1979 | Kindt et al. | 106/75 |
| 4,432,798 | 2/1984 | Helferich et al. | 106/84 X |
| 4,436,538 | 3/1984 | Tomita et al. | 55/523 |
| 4,568,595 | 2/1986 | Morris | 428/65 |
| 4,574,063 | 3/1986 | Scherer | 264/60 |
| 4,629,483 | 12/1986 | Stanton | 55/523 |
| 4,632,683 | 12/1986 | Fukutani et al. | 55/523 |
| 4,721,696 | 1/1988 | Kidd | 502/263 X |

*Primary Examiner*—Caleb Weston
*Attorney, Agent, or Firm*—St. Onge, Steward, Johnston & Reens

[57] ABSTRACT

Described herein are porous ceramic articles comprised of a porous ceramic body portion (of either predominantly open- or predominantly closed-cell porosity) having, integral with pre-selected surfaces thereof, a thin porous ceramic membrane layer which itself may be of open- or closed-celled porosity. Also described are methods of bringing about such membrane layers and such articles. The invention is particularly useful for providing porous ceramic filtering elements, such as diesel particulate traps, wherein the body portion has a predominant open-celled porosity and wherein the porous ceramic membrane surfaces also are open-celled porosity but whose pores are smaller than those of the body portion, as well as for providing articles such as kiln furniture having smooth porous ceramic membrane layers or skins on pre-selected surfaces.

11 Claims, No Drawings

METHODS FOR THE MANUFACTURE OF POROUS CERAMIC SHAPES CONTAINING MEMBRANEOUS SURFACES

BACKGROUND OF THE INVENTION

The present invention relates to ceramic articles and, more particularly, to porous ceramic articles or bodies which possess on one or more surfaces a thin porous ceramic membrane.

It is known in the art to produce porous ceramic articles by a variety of means resulting in structures having a predominant open-cell porosity, particularly useful as filtering elements, or a predominant closedcell porosity useful in applications where strong low-density structures of low thermal conductivity or buoyancy or the like are advantageous.

For example, the use of porous ceramics as filtering elements has become a matter of recent interest in response to increasingly stringent governmental regulations in the United States and European countries regarding maximum allowable particulates (e.g., soot) in the exhaust of automobile or truck diesel engines. Porous ceramic elements have been proposed as filters through which diesel engine exhaust can be passed in order to trap particulates and produce a low-particulate exhaust, and wherein the particulates can then periodically be burned-out (i.e., combusted) within the element in order to regenerate it for continued use. Ceramic materials theoretically lend themselves well to such use because of their excellent structural and dimensional stability under the high temperature conditions encountered during exhaust filtration and periodic regeneration.

Most notable in these efforts has been the utilization of so-called ceramic monolithic honeycomb filtering elements as described, for example in U.S. Pat. Nos. 4,276,071 and 4,364,761 assigned to General Motors Corp.; U.S. Pat. Nos. 4,329,162; 4,415,344; 4,416,675; 4,416,676; 4,417,908; 4,419,108 and 4,420,316 assigned to Corning Glass; and U.S. Pat. Nos. 4,283,210; 4,293,357; 4,307,198; 4,340,403; and 4,364,760 assigned to NGK Insulators. Essentially, these elements consist of a monolithic ceramic having a multitude of internal parallel chambers separated by thin porous ceramic internal walls, with a number of the chambers being end-sealed so as to force particulate-containing exhaust gas to traverse across a porous wall before exiting the element. Generally, these elements are formed by an extrusion process, and materials are included in the composition which are burned out during the firing process to provide the requisite porosity in the internal filtering surfaces. In another process, as reflected in U.S. Pat. No. 4,363,644 assigned to Nippon Soken, foamed, structural polyurethane systems are utilized in admixture with inorganic materials in processes wherein the polyurethane burns out during firing so as to leave behind a ceramic structure having a variety of interconnected open cells for trapping particulates.

The efficiency of porous ceramic filters for removal of particulates from diesel exhaust generally involves a compromise between use of sufficiently small pores to efficiently trap particulates and use of sufficiently large pores to insure a relatively easy path for the exhaust without creation of significant back pressure. To date, the art has not adequately solved this dilemma.

Additionally, a number of potential applications for low-density ceramics exist which require or can be enhanced, functionally or aesthetically, by provision of smoother surfaces than heretofore technically and/or economically possible using known techniques for forming porous ceramic articles.

SUMMARY OF THE INVENTION

According to the invention, there is described a porous ceramic article for use in particular as a trap for diesel exhaust particulates, comprised of a porous ceramic body portion having pores whose average diameter is designed to assure relatively high permeability throughout the body. Integral with the body, at the exhaust discharge surfaces thereof, there is provided a thin porous ceramic membrane layer having pores whose average size is less than that of the pores within the body portion. It has been found that by proceeding in this manner a larger amount of particulates can be trapped since the smaller particulates that could normally pass all the way through the filter are trapped just below the membrane layer surface, causing more particulates to be trapped in the larger pore cavities on the inlet side of the filter, i.e., in the body portion of the porous ceramic. Because the region or length of the membrane surface is short as compared to the body portion, it is found that no significant increase in clean back pressure is encountered while trapping efficiency for particulates is greatly enhanced.

As a consequence of the work performed in this area of particulate traps for diesel exhaust gases, a number of techniques have been developed for formation of the integral porous ceramic membrane layer. Still further, it has been found that the techniques can be applied to produce a wide variety of porous ceramic articles having utility beyond particulate traps, such as filtering elements in general. Moreover, the techniques have applicability to any use of porous ceramic shapes wherein it is desired that one or more surfaces thereof possess a relatively smooth layer or skin as can be provided according to the invention, irrespective of whether the body portion of the ceramic is of the open- or closed-cell type. Notable in this regard is the provision of smooth-surfaced kiln furniture and molds according to the invention.

In its broadest aspects, then, the present invention provides a porous ceramic article having a body portion of any desired shape and configuration, the body portion having associated with it either open- or closedcell porosity characterized by pores of generally predetermined average diameter. On one or more predetermined surfaces or external areas of the body portion there is provided, integral with the body portion at that area, a porous ceramic membrane layer or skin having pores whose average diameter is less than that of the pores within the body portion and on any remaining surfaces or areas of the body portion.

As earlier noted, a specific embodiment of this invention involves filtering elements, i.e., wherein the porous ceramic body portion is characterized by a predominantly open-cell porosity. In such elements, e.g., for use as filter traps for diesel exhaust, the porous ceramic membrane layer advantageously is arranged to be integral with the body portion at the outlet surfaces thereof. In other filtration uses, advantage can be found in arranging this porous ceramic membrane layer at the inlet surface of the body portion, while in others it may be desirable to arrange integral porous ceramic membranes on both inlet and outlet surfaces.

In other specific embodiments of the invention, the porous ceramic membrane layer is utilized as a means for providing a thin smooth surface or skin on predetermined surface areas of a body portion having either a predominantly closed-cell or predominantly open-cell porosity to achieve functional or aesthetic effects.

As is known in the art, there exist a number of ways to form a porous ceramic body portion, and the present invention, in its broadest aspects, is applicable to any and all porous ceramic body portions, however made. As will be apparent from the further discussion of the invention, however, the processes and techniques described for provision of a porous ceramic membrane layer will or may vary depending upon the underlying process for making the body portion per se, and in preferred situations the formation of the porous ceramic membrane layer will be part and parcel of the process used for forming the body portion.

In describing the invention, reference is made to a "thin porous ceramic membrane layer" on selected surfaces of a porous ceramic body. By "thin" is meant a layer which is thin relative to the body portion and, in most embodiments, thin per se as in the nature of a skin. By "porous" is meant that the layer contains pores, which may be connected or unconnected depending upon particular applications, and which may be in the form of generally spherical voids or cylindrical channels or the like. By "membrane" is meant to connote a thin layer and is not necessarily an indication that the layer is permeable, although in certain applications it will be.

DETAILED DESCRIPTION OF THE INVENTION

In one method according to the invention, applicable to porous ceramic body portions made by any number of processes, such as by extrusion of compositions containing fugitive components or by processes employing polyurethane substructures or by processes utilizing foamable ceramic casting or injection-moldable or extrudable compositions, the body portion, after formation but prior to firing, is treated by applying to one or more surfaces or areas thereof a ceramic past or slurry containing a fugitive constituent capable of leaving a small pore when removed during a drying or firing operation. The fugitive constituent can be a sublimable compound or a burnable (e.g., carbonaceous) compound, utilized in a size and an amount which will result in pores having an average diameter smaller than that of the pores which will be present in the body portion or at untreated surfaces. During the firing operation, the ceramic paste or slurry becomes integrally associated with (fused to) the porous body portion. Where the formation of porosity within the body portion is itself dependent upon burn-out or sublimation of a fugitive constituent, the firing operation will, thus, simultaneously develop a porous body portion and an integral porous ceramic membrane layer on the treated areas.

In another method according to the invention, applicable to processes wherein the body portion is prepared from a foamable, castable or injection-moldable ceramic composition, surfaces of the mold corresponding to the areas on the body portion where the ceramic membrane is desired to be formed, are treated by application thereto (generally onto the mold release agents already present) of a mixture of ceramic powder and fugitive constituent. The castable or moldable composition is then poured or injected into the mold and, after setting and removal from the mold, is found to have associated with it at the areas corresponding to the pre-treated mold surfaces, a thin skin of ceramic material which is rendered porous during the firing step. In this embodiment, it is also possible to eliminate use of fugitive constituents by choosing for the ceramic powder ingredients which are more refractory than those of the underlying body portion, such that during firing, the greater refractoriness of these grains prohibits sintering thereby leaving a partially-sintered, i.e., porous, membrane layer on the preselected areas of the body portion.

Among the preferred methods according to the invention include those specifically applicable to processes wherein the underlying porous ceramic body portion is formed through use of a foamable, castable or injection-moldable ceramic composition which can be poured or injected into a mold and set therein to assume the mold configuration while at the same time developing porosity of the closed- or open-cell type by virtue of reactions and interactions between and among components of the composition, e.g., involving release of a gaseous constituent. One method of forming a porous ceramic membrane layer on preselected surfaces of such body portions involves the application of a ceramic paper (either woven, air-laid, or the like) atop the release agent on one or more predetermined mold surfaces prior to molding the ceramic composition. In this manner, the composition, during foaming, expands into the ceramic paper, thereby laminating or bonding the systems together. On firing, there is developed a porous body portion having on one or more of its surfaces a thin porous ceramic membrane layer by reason of the now integrally-bonded ceramic paper whose pores are on the average smaller than those of the underlying body portion.

In the most preferred methods according to the invention for use with foamable, moldable ceramic compositions, formation of a porous ceramic membrane layer is accomplished integral with the formation of the underlying porous body. In situ processing in this manner offers significant advantage in the economics of manufacture of the final ceramic article.

According to one of these preferred methods, the release agent used in the mold, at those preselected areas corresponding to where on the body portion the ceramic membrane is desired, consists of or contains a defoaming surfactant (i.e., a foam suppressor). During the internal development of porosity in the cast or injected composition by virtue of gas-generating reactions therein, the defoaming agent acts to sufficiently suppress the reaction to keep the pores at these surfaces controllably small, i.e., smaller than those within the body portion and at surfaces not in contact with the foam suppressor. Since the surfactant is per se a release agent or is associated with a release agent, no problems are encountered in demolding the part. The choice of defoaming surfactant is dependent upon the chemistry of the fundamental foaming reaction. Thus, in the case of air entrapment type foaming (i.e., in situ gas generation and surfactants to size and stabilize the bubbles so formed), commonly used surfactants for the defoaming of detergents, paints, varnishes and the like are eminently suitable.

A particularly suitable foamable composition for forming porous ceramic bodies of predominant open- or predominant closed-cell type is based upon an aluminosilicate hydrogel system (see, e.g., U.S. Pat. Nos. 4,357,165 and 4,432,798, both incorporated herein by reference) in association with refractory ceramic materials, particulate metal and surfactants. Reaction between particulate metal and alkali components in the composition produce hydrogen gas and the surfactant stabilizes and controls the size of the bubbles so formed, while the aluminosilicate hydrogel forms and sets to bind together the porous structure into a selfsupportable shape which can then be fired into a porous ceramic article.

In the context of such compositions, a number of techniques have been developed for in situ formation of a porous ceramic membrane layer or skin on preselected surfaces or areas of the porous ceramic body portion.

According to one such method, there is used, as the release agent per se or along with a release agent, a foam suppressing agent consisting of an organic compound having an unhindered hydroxyl group (i.e., an OH-"tail"), such as common alcohols, polyethylene glycol, polyvinyl alcohol, and the like. By provision of such agents on mold surfaces corresponding to those areas of the body portion where the porous ceramic membrane layer is desired, the hydroxyl group apparently absorbs the outgassing hydrogen molecules at these surfaces, thereby restricting their growth. A porous ceramic membrane is attained by virtue of the underlying foaming reaction and the fact that hydrogen gas bubbles at the desired surfaces are kept small.

In another method applicable to this aluminosilicate system, mold surfaces corresponding to those where a porous ceramic membrane is desired to be formed are provided with a gel accelerating agent, preferably along with a release agent, and most preferably along with a release agent consisting of or containing an OH-tail as above described. The gel accelerating agent serves to locally set the aluminosilicate hydrogel prior to reaction between the particulate metal and alkali compounds in the composition, with the result that in the fired article, the pores at these treated surfaces are smaller than those in the underlying body portion or at other surfaces.

A characteristic of the aluminosilicate hydrogel system is that gelation can be accelerated by variation in concentration of soluble silicate and soluble aluminate. The nature of the system is such that more rapid gel formation will occur both at conditions of lower soluble silicate concentration (i.e., by dilution of the system) as well as at conditions of high concentrations of soluble silicate and aluminate (e.g., by minimizing water in the system). Thus, additional methods to achieve localized rapid gelation of the aluminosilicate system at surfaces where a porous ceramic membrane is desired include incorporation of water along with the release agent at the desired mold surfaces, the water being in an amount such that the combined, but not yet set, silicate and aluminate mixture absorbs a sufficient portion of this water to locally dilute the original amounts of soluble silicate and soluble aluminate, thereby locally reducing the gel time at these surfaces as compared to that occurring throughout the remainder of the composition. In another method, it can be arranged that water is locally removed from surfaces where a porous ceramic membrane is desired so as to bring about more rapid gelation of the aluminosilicate system at those areas (by virtue of increased silicate and aluminate solids content). This can be achieved, for example, by treating the corresponding mold surfaces with a hydroscopic release agent (or a release agent composition containing a hydroscopic agent) or by arranging a layer of dry paper at the required mold surface or by localized heating of the required mold surface.

Another method applicable to the preferred sodium aluminosilicate hydrogel system as well as with other catalyzed silicate systems is to bring about a change in pH on the surface where the porous ceramic membrane is required. For example, incorporation of an acidic component in the release agent such as acetic acid or dilute hydrochloric acid will locally accelerate the gelation prior to the onset of foaming.

It should be pointed out that the process of using a gel accelerator to cause a membrane effect on a castable or moldable foam can be extended to other catalyzed silicate systems as indicated above, as well as to other self setting binder systems, both inorganic and organic in nature, for example, this same process can be used to form a membrane in a phosphoric acid containing binder system in which the acid reacts with alumina materials (or compounds) to form an aluminum phosphate inorganic bond. Addition of metal powders to such a system will generate gaseous by-products that will foam the mixture to produce a porous ceramic body portion. If a ceramic membrane is desired, then the incorporation of a gel accelerator such as a stronger concentration of phosphoric acid in the release agent would produce this result.

Similarly, in an organic binder system such as a phenolic thermosetting resin system in which the phenolic resin is catalyzed with an acidic solution, gaseous by-products could again be generated with metal powders to bring about a porous ceramic body portion, and again by incorporating a stronger acid in the release agent the membrane effect is accomplished.

As noted at the outset, a particular utility for the porous ceramic articles according to the invention, i.e., those having on one or more surfaces a thin porous ceramic membrane layer of smaller pore size than that of the body portion or remaining surfaces, is in the manufacture of diesel particulate traps. For example, in comparing porous ceramic filter plates (identical in all respects except for provision of a porous ceramic membrane layer on the outlet surface of one such filter plate) as exhaust filters for a 6.2 liter diesel engine, it was found that filters having the ceramic membrane collected a greater percentage of the particulates generated by the diesel engine, indicating a greater efficiency at similar back-pressure development.

While the above methods for producing a porous ceramic membrane layer on selected surfaces of a porous ceramic body portion allow for production of more efficient filtering devices, the same technology is useful in the production of porous ceramic articles (of predominantly open- or predominantly closed-cell porosity) for a wide variety of uses, particularly those wherein one or more smooth surfaces are required. Notable examples in this regard include low mass kiln furniture (i.e., the refractory shapes used to support ceramic ware during the firing process, including shelves, contoured supports and spacers referred to in the industry as batts, setters (box, plate and yoke-ring) and the like), furnace linings, mold materials for conventional slip casting of ceramic ware, and other like uses. Smooth-surfaced furnace linings are advantageous in reflecting more heat than is absorbed, for example. Another advantageous use of the thin porous ceramic membrane layer of the invention is in foundry molds or cores where the body portion can be made from inexpensive materials and of a porosity which permits easy removal of core or mold material after the casting has been made, while a membrane layer can be provided using the more expensive inert materials required for the particular metal being cast, and in this way greatly reducing overall cost and processability as compared to a mold or core made entirely of the expensive inert materials. Particular advantage is found in applications, such as those above, where functional considerations require the provision of porous ceramic articles of complex shape. The use of moldable, foamable ceramic compositions is ideally suited for manufacture of articles of complex geometry, and the present invention, in providing means for arranging such compositions to produce smooth porous membrane layers on selected surfaces of the overall porous body portion, greatly expands the potential uses and functionality for such castable compositions.

As noted above, a particular application requiring a smooth porous ceramic membrane surface over a porous ceramic substrate material is in the area of mold materials for conventional slip casting of ceramic ware. Currently such molds are made with plaster materials that have been slightly dried so that they are extremely absorbent to the moisture in the ceramic slip. Typical ceramic slips used in the production of dinnerware, for example, contain 20 to 30 percent water. Once cast against a dried plaster mold, water is gradually "sucked" out of the slip and into the plaster. As the moisture is removed, the green strength of the slip increases until a strong, leather-like consistency is obtained. Once sufficient water is removed and strength obtained, the cast dinnerware can be removed from the plaster mold and further dried prior to firing to the required temperature. The plaster mold is then redried and reused. The number of times a particular plaster mold can be reused depends on the level of detail required in the slip cast part. With continued use, the plaster surface will deteriorate and the mold will have to be discarded.

Currently, the technology does not exist to allow the reuse of the spent plaster. As a result, huge waste piles of this plaster are collecting in landfills. Disposal is becoming a definite part of the production cost and alternatives to plaster molds are therefore being actively pursued. One method being employed more and more often is the pressure case and/or the compression molding of simple shapes in permanent molds. Difficult shapes, i.e., those with complex configurations cannot be produced by these methods, however, and the traditional plaster molding process must therefore be used.

The smooth porous ceramic membrane configuration of the present invention is an ideal substitute for the plaster molds described above. The strength and durability of such ceramic membrane porous molds is considerably higher than that of the plaster system. This aspect, coupled with the ability of using vacuum assisted dewatering of the ceramic slip material being cast against the mold, implies a considerable improvement in the cost of producing ceramic ware parts. In addition, the disposal of the ceramic mold is not as critical a problem as the plaster. If desired, the material can be ground up, sized and reused to make more molds.

The invention is further described with reference to the following examples.

EXAMPLE 1

A particular effective ceramic foam filter for the high temperature filtering of diesel particulates was prepared by casting of a foamable sodium aluminosilicate hydrogel bonded system containing refractory ceramic compounds, powdered aluminum metal and surfactants to create a plate of predominantly open-celled porosity in which one side of the mold surface was coated with a release agent based on polyethylene glycol 3350, polyvinyl alcohol, glycerine and water of the following composition:

polyethylene glycol 3350: 17.5%
polyvinyl alcohol solution: 12.5%
glycerine: 36.5%
water: 33.5%

Once the silicate and aluminate containing slurries were combined and cast into the mold, the mix adjacent to the above release agent rapidly gelled, thereby preventing the growth of any hydrogen gas bubbles that may have formed near the mold surface as the result of the reaction of the aluminum metal powder and the sodium hydroxide in the mix. After demolding, the cast part displayed an excellent "skin" or smooth membrane surface that, upon further processing to remove sodium and water, followed by firing at a suitable temperature to form ceramic bonds, remained porous even though by naked eye the surface appeared dense.

A series of 10 inch foamed plates produced in this manner with ceramic membrane surfaces on one side were fashioned into a stacked element filtering arrangement. The efficiency of the diesel particulate collection was measured using a suitable device at a major diesel engine manufacturer's test facility and found to be in the 65–70% efficient range. Such efficiencies would make the 1991 and 1994 diesel engine prototypes now being designed meet the EPA emission standards.

EXAMPLE 2

Another particularly effective mold release that works in the sodium aluminosilicate hydrogel system to create a membrane surface again uses water as the gel accelerating ingredient and simple glycerine for its release effects as follows:

glycerine: 50%
water: 50%

Again, after the silicate and aluminate containing slurries were combined and cast into the mold with the above release agent, a rapid gelation occurred against this surface creating a smooth skin free of large gas bubbles since the surfaces in question had already set prior to foaming.

EXAMPLE 3

In a similar manner to that of Example 1, the same mold can be coated on one surface with a thin layer of woven mullite fibered paper. The sodium aluminosilicate hydrogel system is cast and allowed to foam in the normal manner. After demolding, the woven paper is significantly attached to the ceramic foam so that no separation occurs during the subsequent processing to remove sodium and water prior to firing. The resultant laminated structure will exhibit excellent thermal shock and filtering efficiency.

EXAMPLE 4

A silicone release agent modified with a silicone defoaming surfactant was sprayed on one side of a metal mold that was heated to 140°–150° F. The other side of the mold remained at room temperature. A sodium aluminosilicate hydrogel bonded foaming mix such as that disclosed in Example 1 was then cast into the mold.

Due to the accelerated set time of the gel adjacent to the heated surface, insufficient time was available for the foam cells to grow to any appreciable size. The further away from the hot surface, the larger the cell walls were able to grow prior to gelation. Even though the surface adjacent to the heated surface appeared smooth and dense to the naked eye, once the foam was rinsed in deionized water and subjected to ionic exchange to remove the sodium from the hydrogel structure, this same surface was actually quite porous and provided an excellent ceramic membrane effect.

In accordance with the present invention, there are provided porous ceramic articles of either the predominantly open- or predominantly closed-cell type having on one or more selected surfaces thereof a thin porous ceramic membrane layer, as well as processes for producing such articles. having described the invention with reference to particular compositions, processes, examples and embodiments, it is to be understood that these particulars are presented for purposes of illustration and description, and are not otherwise intended as strict limitations upon the scope of the fundamental invention as defined in the appended claims.

What is claimed is:

1. A process for producing porous ceramic articles comprising providing a foamable, moldable ceramic composition capable of being molded to a desired configuration and set in said configuration to a self-supporting porous shape; providing on selected mold surfaces an agent for bringing about formation of a porous ceramic membrane layer on those surfaces of said porous shape in contact with said mold surfaces; introducing said foamable, ceramic composition into said mold and permitting it to remain in said mold until such time as said self-supportable porous shape is formed; removing said self-supportable shape; and firing said self-supportable porous shape to produce a porous ceramic article having on said selected surfaces a thin smooth, porous ceramic membrane layer, the pores of which have an average diameter less than that of the pores throughout the remainder of said article.

2. The process of claim 1 wherein said agent comprises ceramic paper; wherein said ceramic paper becomes integrally associated with said selected surfaces of said shape within the mold; and wherein the firing of said shape and associated ceramic paper forms a porous ceramic article having integrally bonded thereto at said selected surfaces a porous ceramic membrane layer.

3. The process according to claim 1 wherein said foamable, ceramic composition develops porosity within said mold as a consequence of reaction between components of said composition which generates gas bubbles and wherein the bubbles of said gas are acted upon by surfactants in said composition to control their size and produce within said composition pores of generally controllable size; and wherein said agent comprises a defoaming agent capable of maintaining gas bubbles and pores at the portions of said composition in contact therewith controllably smaller than those formed throughout the remainder of said composition.

4. The process according to claim 1 wherein said foamable, ceramic composition develops porosity as a result of formation therein of hydrogen gas, and wherein said agent comprises an organic compound containing an unhindered hydroxy moiety capable of absorbing hydrogen gas at the surfaces of said composition in contact therewith to cause the pores formed by said gas at said surfaces to be smaller than those formed throughout the remainder of said composition.

5. The process according to claim 1 wherein said thin porous ceramic membrane layer is predominantly of open-celled porosity.

6. The process according to claim 1 wherein said thin porous ceramic membrane layer is predominantly of closed-celled porosity.

7. The process according to claim 1 wherein said foamable, composition is rendered self-settable within said mold as a consequence of reaction between and among components of said composition to form a gelled binder for all components therein, and wherein said agent comprises a gel accelerator effective to bring about more rapid setting of the composition at those surfaces in contact with said agent than in remaining areas throughout said composition, and thereby limit the size of pores capable of being formed at said more rapidly set surfaces.

8. The process according to claim 7 wherein said gelled binder is an aluminosilicate hydrogel.

9. The process according to claim 8 wherein said gel accelerator comprises water.

10. The process according to claim 8 wherein said gel accelerator comprises a hydroscopic agent.

11. The process according to claim 8 wherein said gel accelerator comprises an agent for lowering the pH of the composition at the surfaces thereof in contact with said agent.

* * * * *